June 3, 1941.    W. S. CLARKSON    2,244,329
FLUID METER
Filed June 5, 1939    3 Sheets-Sheet 1

Inventor
WILLIAM S. CLARKSON.
Attorney

June 3, 1941.  W. S. CLARKSON  2,244,329
FLUID METER
Filed June 5, 1939  3 Sheets-Sheet 2
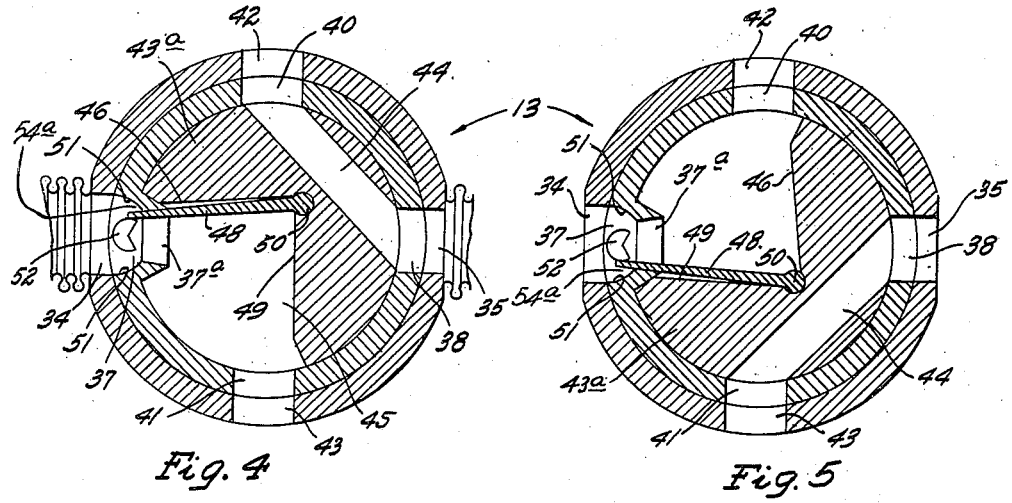
Fig. 4  Fig. 5
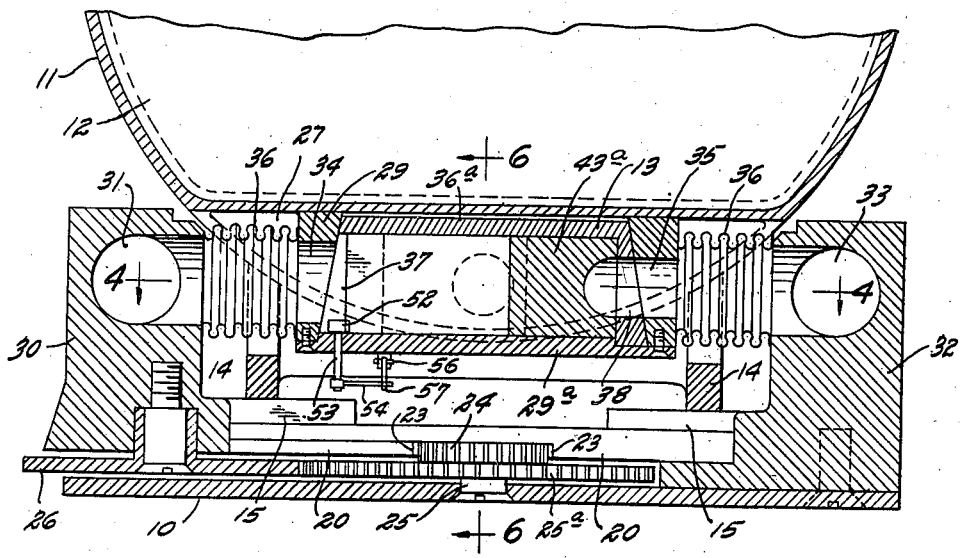
Fig. 3
Inventor
WILLIAM S. CLARKSON.
By
Attorney Patented June 3, 1941

2,244,329

UNITED STATES PATENT OFFICE 2,244,329

FLUID METER

William S. Clarkson, Ann Arbor, Mich.

Application June 5, 1939, Serial No. 277,334

14 Claims. (Cl. 73—241)

This invention relates generally to meters and more particularly to fluid weight meters.

Another object is to provide a liquid weight meter which will weigh liquid accurately irrespective of temperature changes of the liquid.

Another object of the invention is to provide a weight meter capable of measuring a variety of weights with equal accuracy.

A further object of the invention is to provide a meter which will accurately measure any sub-weight of the amount being measured.

Another object of the invention is to provide a new and improved fluid meter which is accurate in measuring fluid and yet one which is simple in structure and inexpensive.

Another object of the invention is to provide a new and improved fluid meter which is operable in response to a predetermined weight of fluid and having provisions for varying said predetermined weight.

Other objects of the invention will become apparent from the following detailed description taken in connection with the accompanying drawings in which—

Fig. 3 is a view of the device shown in cross section, taken along the line and in the direction of the arrows 3—3 of Fig. 1;

Fig. 4 is a view shown in section of a fluid pressure responsive valve employed in the meter;

Fig. 5 is a view similar to Fig. 4 showing the operating parts thereof in different positions;

Figure 1:
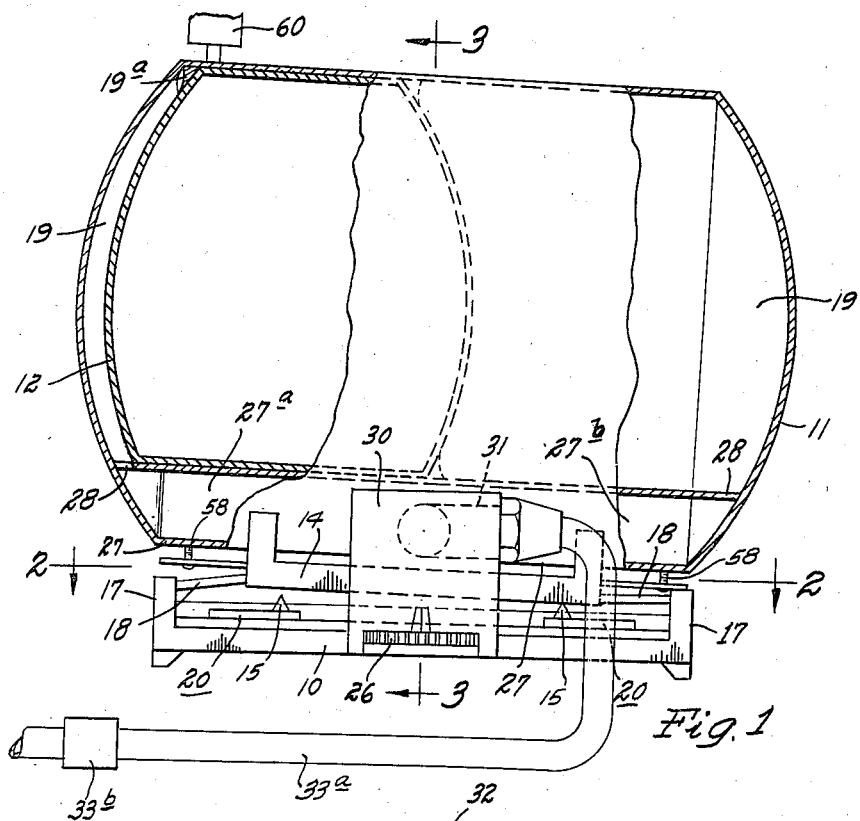
Figure 1 is a view in side elevation of my improved fluid meter shown broken away and partly in section.
Figure 2:
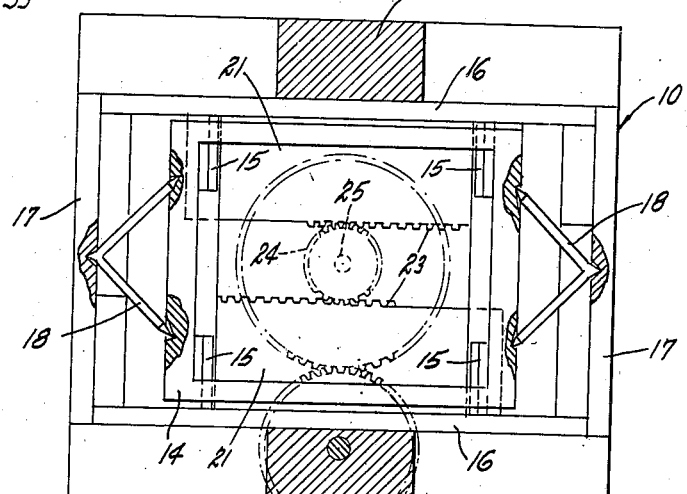
Fig. 2 is a view of the device taken along the line and in the direction of the arrows 2—2 of Fig. 1.
Figure 6:
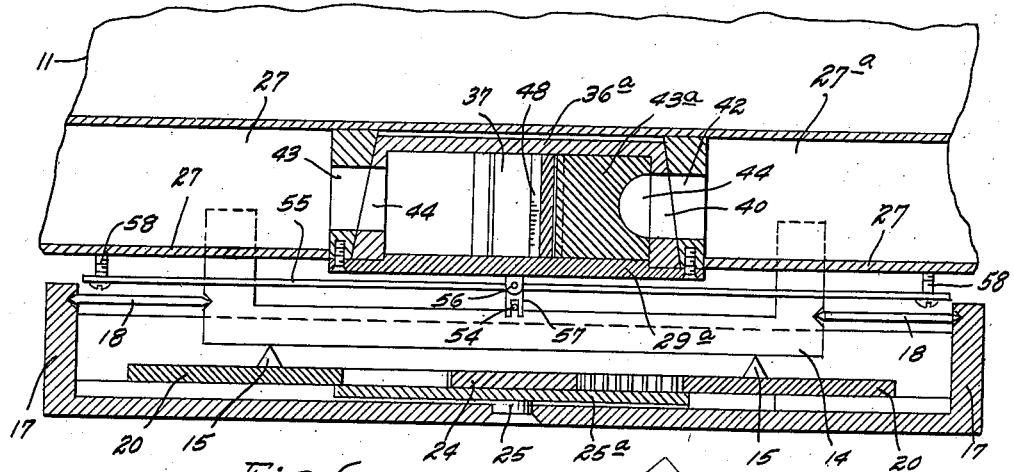
Fig. 6 is a view of the device in section and taken along the line 6—6 of Fig. 3.

Referring to the drawings by characters of reference, the present meter comprises in general a support or base 10, a rockable container or hollow pendulum 11, a piston 12 and a pressure responsive fluid flow control valve 13. Rigidly secured to the container 11 is a rectangular frame-like support 14 which is arranged to seat on upwardly directed knife edge pivots or fulcrums 15 which are movably and adjustably supported on the base 10. Preferably, the base 10 is provided with integral side walls 16 and end walls 17 and these end walls and the ends of the support 14 are provided with sockets to receive pivot pins 18, the opposite ends of which may be pointed or conical to seat in the sockets. The pins 18 permit rocking or tilting of the container but prevent longitudinal and lateral movement of the container relative to the fulcrums thereof. The piston 12 divides the interior of the container 11 into two expansible-contractible end chambers 19 and secured to opposite ends of the piston 12 to engage slidably the inner wall surface of the container are sealing rings 19a which may be solder or other suitable material. These sealing rings 19a also serve to limit movement of the piston toward and space the piston from opposite end walls of the container 11 as shown in Fig. 1.

Figure 7:
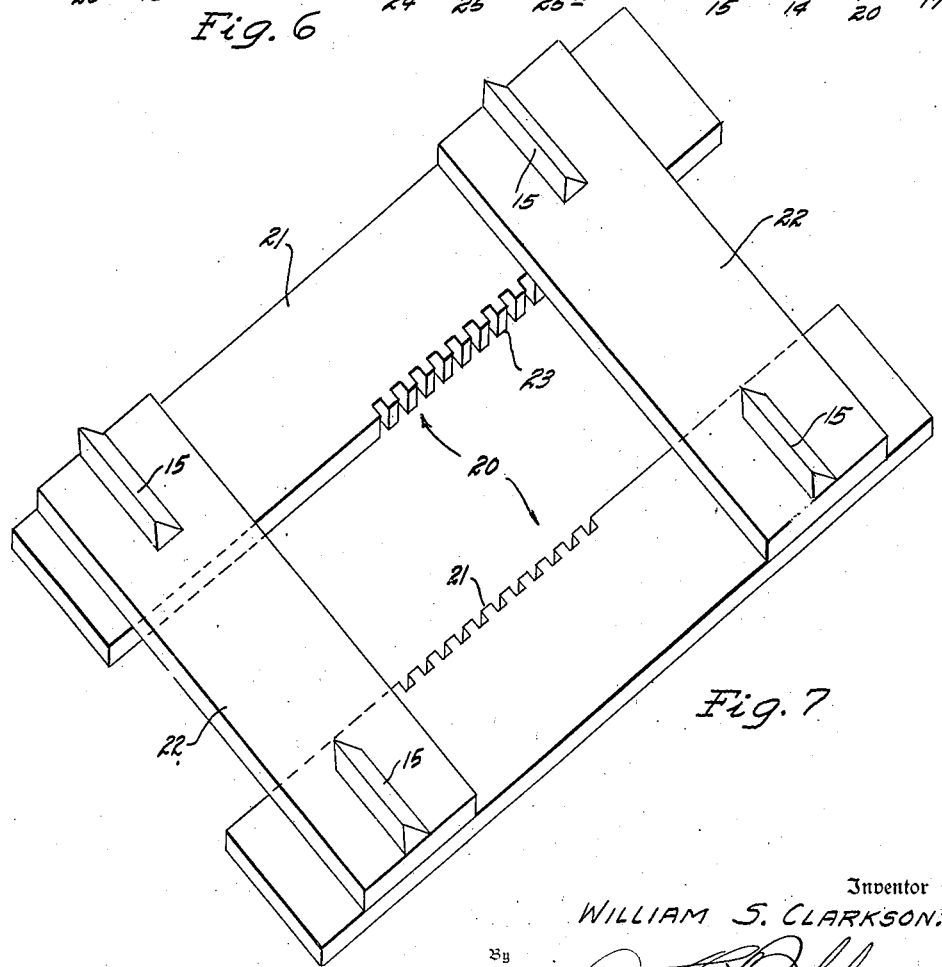
Fig. 7 is a view in perspective of certain parts of the device.

The knife edge fulcrums 15 are integral with and are directed upwardly from L-shaped plate members 20, there preferably being a pair of aligned laterally positioned knife edges on each of the plate members 20. The plate members 20, Fig. 7, each comprises a longitudinally extending rectangular portion or strip 21 integral with which is a laterally extending portion or strip 22, the outer side edges of the longitudinally extending strips having sliding contact with the inner wall surfaces of the base side walls 16 which serve as guides for the plate members. The transverse strip portions 22 are upwardly offset with respect to their longitudinally extending portions 21, and end portions of the strips 22 rest and are slidable on the upper surfaces of opposite strip portions 21. The opposed inner edges of the strip portions 21 are spaced from each other and are provided with gear teeth 23 which are in mesh with a gear 24 secured on and to a vertical shaft 25 on which is also secured a second and larger gear 25a in mesh with a manually operable gear 26. It will be seen that by rotating gear 26, the fulcrums 15 may be moved toward each other or away from each other, as desired.

The container 11 is provided with a duct 27 which extends longitudinally of and immediately beneath the container 11 and at its opposite ends, the duct 27 communicates with the container through apertures 28 which lead into the container on opposite sides of the piston 12. The valve 13 is carried by the container 11 and is interposed in and divides the duct 27 into two flow passages 27a and 27b, communicating one with each of the chambers 19. In the present instance, apertures 28 and flow passages 27a and 27b constitute both inlet and outlet for their respective end chambers 19. The valve 13 includes a casing 29 the upper end of which abuts the bottom wall of the piston chamber to which the casing 29 may be welded or be otherwise suitably secured thereto. At one side of the container, substantially midway of the ends thereof, an upstanding member or metallic block 30 is rigidly mounted on the base 10 and is provided with an inlet passage 31, and on the other side of the container a similar metallic block 32 rigidly mounted on the base 10 is provided with an outlet 33. Connected to the inlet is a liquid supply line or conduit 33a in which an air strainer 33b is preferably provided. The inlet passage 31 and the outlet passage 33 are connected to passages 34 and 35 respectively in the side wall of the valve casing 29 by flexible couplings 36, preferably open ended metallic bellows. The passages 34, 35, are diametrically oppositely disposed and in the casing 29 is a valve body 36a having diametrically opposite ports 37, 38, which align or register respectively with the passages 34, 35. Also, the valve body 36a is provided with a pair of diametrically opposite ports 40, 41 which respectively align or register with ports 42, 43 provided in the side wall of the casing 29, the ports 42 and 43 opening one into each of the passages 27a leading to the chambers 19 on opposite sides of the piston 12. Thus, the valve 13 divides the flow passage 27 into two separate passages, one of which communicates with the container on one side of the piston 12 and the other of which communicates with the container on the other side of the piston. A rotatable valve member 43a operated by fluid pressure acting thereagainst is provided for controlling flow of fluid to the chambers 19.

The valve member 43a seats on a removable closure member or cover 29a which closes and seals the lower end of the valve casing 29 and may be rigidly secured thereto by screws or by other suitable means. The valve member 43a is provided with a passage 44 which in one position of the valve, Fig. 4, establishes communication between ports 38 and 40 and in another position of the valve, Fig. 5, the passage 44 establishes communication between ports 38 and 41. The valve member 43a is further provided with an opening or passage 45 which in the position of the valve in Fig. 4 establishes communication between inlet port 37 and outlet port 41 and in the position of the valve in Fig. 5 establishes communication between inlet port 37 and outlet port 40. Thus, with communication established between the inlet port 37 and one of the outlet ports 40, 41, communication will be established between the other of the ports 40, 41 and the outlet 38.

The inlet 37 opens into a vertically elongated aperture 37a and the casing wall defining the inlet projects into the valve body 36a and serves as a stop for limiting rotation of the valve member 43a in opposite directions. The opening 45 in the valve member 43a provides surfaces 46 and 49 against which fluid pressure acts to rotate the valve in one direction or the other, and the direction of rotation of the valve is controlled by a vane 48 which is adapted to control the direction of fluid flow into the valve body. Preferably, the vane 48 is rectangular in shape and at one end is provided with an enlarged, substantially cylindrical portion 50 journaled for free rotation in a vertical bore in and eccentric with respect to the axis of rotation of the valve member 43a. The vane 48 extends between the valve member surfaces 46, 49 and the free end of the vane extends through passage 37a and projects into the inlet 37 which preferably is provided with curved side walls 51 tapering or converging inwardly of the valve body.

A rotatable latch member 52 is provided in the inlet 37 and is adapted for releasably holding the vane 48 either in the position shown in Fig. 4 or in the position shown in Fig. 5. In the position shown in Fig. 4, the vane 48 abuts one side wall of the rectangular passage 37a preventing fluid pressure from acting against the adjacent surface 46 of the valve member 43a which permits the pressure acting against the other valve surface 49 to move and hold the valve in the position shown, establishing communication between the inlet 37 and port 41 leading to one of the container chambers 19 and further establishing communication between port 40, leading from the other of the container chambers 19, and the outlet port 38. In Fig. 5, the vane 48 is against the other side of opening 37a and the valve 43a has been rotated by fluid pressure acting against valve surface 46 and is being held in a position establishing communication between inlet port 37 and port 40 and establishing communication between port 41 and outlet port 38. In either position of the vane 48, the free end portion thereof projects into inlet port 37 and cooperates with one or the other of the side walls thereof to provide a pocket 54a wherein fluid pressure acts to pivot the vane 48, this action being enhanced by the angle of the vane with respect to the direction of fluid flow. The latch member 52 is mounted on a vertical shaft 53 journaled in a bore in the valve casing cover 29a. The shaft 53 extends below the under surface of the cover 29a and secured to the shaft is an operating arm 54. Above the arm 54, a lever 55 is pivoted, as at 56, and the lever 55 is provided with a depending bifurcated arm 57 to receive the operating arm 54. The lever 55 extends longitudinally of the container or cylinder 11 to be operated thereby, the lever being provided adjacent opposite ends thereof with adjustable abutment screws 58 for engagement with the outer wall surface of the container. Any well known type of counter 60 may be provided and may be operated by the rocking movement of the container 11.

*Operation*

In operation of the herein described meter, the stroke of the piston 12 and therefore the amount of liquid measured each time that the container rocks or tilts on one of its fulcrums 15 depends upon the adjustment of the fulcrums. For example, the fulcrums moved outwardly to their extreme positions, as shown in the drawings, establish the maximum stroke of the piston 12 and corresponding maximum amount of liquid measured each tilting of the container 11. Or in other words, variations of the lever arms due to movement of the fulcrums 15 correspondingly varies the weight of liquid required to tilt the container. In employing the meter, liquid or other fluid to be measured is supplied to the inlet and passes through the adjacent bellows 36, passage 34, port 37, and passage 37a into the valve body. Assuming that at the moment, the valve 43a is in the position shown in Fig. 5, liquid will flow from the valve inlet passage 37a through valve opening 45, passages 40, 42 into passage 27a leading into the piston chamber 19 on the left side of the piston, facing Fig. 1. The pressure of the liquid acting against the left end of the piston moves the piston to the right, Fig. 1 displacing liquid in the container 11 on the right side of the piston. The displaced liquid passes through passage 27b, ports 43, 41, valve passage 44, passage 38, to the outlet 35. The fluid flow passages including the various valve passages, passages 27a, 27b and opposite ends of the container 11 are continuously filled solid with liquid when liquid is the fluid to be measured. When the weight of liquid in the left hand side of the container reaches a predetermined weight, the weight differential will cause the container 11 to tilt or rock on its left hand fulcrum 15, facing Fig. 1. Upon tilting of the container on the left hand fulcrums, lever 55 is pivoted and rotates the latch 52 in a clockwise direction, Fig. 5, releasing the pressure responsive vane 48 which with a quick or snap action is pivoted by the liquid in a clockwise direction, facing Fig. 5, into engagement with the opposite side wall of passage 37a. At the same time as the vane operates, fluid pressure acting against the valve surface 49 rotates the valve 43a in a counter-clockwise direction to the position shown in Fig. 4 in which position the inlet 37a now communicates with port 41 leading to the right hand side of container 11, and port 40 leading to the left hand side of the container is in communication with the outlet 38. By reason of the vane being eccentrically connected to the valve 43a the vane upon rotation of the valve moves away from the latch 52 and then back toward the latch to position against the opposite side thereof in latched position as shown. As shown, the piston 12 is made hollow and of a suitable light weight material whereby the effect of the weight of the piston on the tiltable container will for all practical purposes be negligible.

In general, during operation of the meter, the container tilts first on one set of fulcrum points and then on the other in accordance with a predetermined difference in weight on opposite sides of first one and then the other set of fulcrum points. Tilting of the container actuates the valve 13 which operates to direct flow of fluid first to one side of the piston and relieve fluid from the container on the other side of the piston and then reverse the operation. As a result equal predetermined weight increments of fluid are measured the number of which will be recorded by the counter. If it is desired to measure fluid in smaller increments, the fulcrums 15 are moved inwardly toward each other by rotating the wheel or gear 26 on which may be provided a scale corresponding to the range of adjustment of the fulcrums 15 whereby the quantities of the equal increments of fluid measured may be known and conveniently selected.

While I have shown and described my invention in detail it is to be understood that the same is to be limited only by the appended claims for many changes may be made without departing from the spirit and scope of the invention.

What I claim is:

1. In a fluid meter, a rockable, elongated container, a pair of fulcrums for said container and spaced apart longitudinally thereof, a piston in said container, said container having fluid inlet and outlet means on each side of said piston and being rockable alternately on said fulcrums by and in accordance with the difference in weight of the fluid in said container on opposite sides of said piston, and flow control means operable to control said inlet and outlet means in accordance with rocking movement of said container, and means operatively connecting said container and said flow control means.

2. In a fluid meter, a container, a hollow piston in said container and dividing the interior thereof into two chambers, said chambers each having inlet and outlet means for fluid, a pair of upwardly directed fulcrum members for said container, said container being rockable alternately on said fulcrum members by and in accordance with a difference in weight of fluid in said chambers, and valve means controlling said inlet and outlet means and controlled by said rockable container.

3. In a fluid meter, a container, a hollow fluid pressure responsive piston in said container dividing the interior thereof into two variable capacity chambers, said chambers being alternately inlet and outlet chambers, fluid pressure responsive valve means operable to control flow of the fluid into and out of said chambers, said container being rockable by and in accordance with the difference in weight of fluid in said chambers, latch means releasably restraining operation of said valve means and operable by said container, and means operatively connecting said latch means and said container.

4. In a fluid meter, a movable container, movable pressure responsive means in said container, said container having expansible chambers on opposite sides of and formed in part by said movable pressure responsive means, fluid inlet and outlet means for said chambers, said container being movable by and in accordance with a differential in weight of fluid on opposite sides of said responsive means, valve means controlling flow of fluid to opposite sides of said responsive means latch means releasably restraining operation of said valve means and releasable by movement of said container, and means operatively connecting said latch means and said container.

5. In a fluid meter, a movable container, movable pressure responsive means in said container, said container having expansible chambers on opposite sides of and formed in part by said movable pressure responsive means, fluid inlet and outlet means for said chambers, said container being movable by and in accordance with a differential in weight of fluid on opposite sides of said responsive means, pressure responsive valve means controlling flow of fluid to opposite sides of said responsive means, and latch means controlling operation of said valve means in accordance with movement of said container.

6. In a fluid meter, an elongated container for fluid to be measured, a piston reciprocal in said container, said container having chambers at opposite ends of said piston, inlet and outlet means for said chambers, a pair of knife edge fulcrums relatively spaced longitudinally of said container, said container being arranged to rock alternately on said fulcrums in accordance with a differential in weight of fluid in said chambers, and valve means controlling flow of fluid into and out of said chambers and operable by rocking of said container.

7. In a fluid meter, an elongated container for fluid to be measured, a piston reciprocal in said container, said container having chambers on opposite sides of said piston, inlet and outlet means for said chambers, a pair of pivots for said container and spaced longitudinally thereof, said container being arranged to rock alternately on said pivots in accordance with a differential in weight of fluid in said chambers, valve means controlling flow of fluid into and out of said chambers and operable by rocking of said container, latch means releasably restraining operation of said valve means and means controlling operation of said latch means and operable by said container.

8. In a fluid meter, an elongated container for fluid to be measured, a reciprocal piston in said container providing chambers on opposite sides of said piston, inlet and outlet means for said chambers, a pair of laterally positioned movably adjustable pivots spaced longitudinally of and on which said container is arranged to pivot alternately, said container being pivoted upon a predetermined differential in weight of fluid in said chambers, means controlling flow of fluid to said chambers and adjustment means for moving said pivots toward or away from each other.

9. In a fluid meter, an elongated container for fluid to be measured, a reciprocal piston in said container providing chambers on opposite sides thereof, inlet and outlet means for said chambers, a pair of spaced pivots for said container and movable toward and away from each other longitudinally of said container, said container being arranged to rock alternately on said pivots in accordance with a predetermined differential of fluid weight in said chambers, valve means operable in response to rocking movement of said container for controlling said inlet and outlet means, and means to move said pivots relative to each other longitudinally of said container to vary said weight differential.

10. In a fluid meter, a movable container having end walls, a piston in said container providing chambers on opposite sides of said piston, stop means limiting movement of said piston in opposite directions toward said end walls to space said piston from said end walls, duct means carried by and below said container, said duct means extending longitudinally of said container, inlet and outlet means connecting said duct means to one of said chambers, inlet and outlet means connecting said duct means to the other of said chambers, valve means disposed in said duct means between said first-named inlet and outlet means and said second-named inlet and outlet means, said valve means dividing said duct means into two passages, said valve means being responsive to fluid flow and controlling flow into and out of said passages, outlet means from said duct means and controlled by said valve means, latch means releasably restraining operation of said valve means, and means operatively connecting said means and said container.

11. In a fluid meter, a container, a piston reciprocal in said container and providing therein expansible-contractible chambers on opposite sides of said piston, inlet and outlet means for one of said chambers, inlet and outlet means for the other of said chambers, said container being rockable upon predetermined differential in weight of fluid in said chambers, fluid duct means communicating with said first-named inlet and outlet means and with said second-named inlet and outlet means, fluid pressure responsive valve means in said duct means and operable to control flow to said chambers, latch means operable to restrain operation of said valve means prior to rocking action of said container, and means operatively connecting said latch means and said container.

12. In a fluid weight meter, a tiltable container, a reciprocal piston in said container dividing the interior thereof into expansible chambers at opposite ends of said piston, inlet and outlet means for each of said chambers, valve means controlling said inlet and outlet means of each chamber and operable to alternately direct fluid flow into said chambers, fulcrum members for said container and spaced apart in the direction of movement of said piston, said container being tiltable by and upon a fluid weight differential in said chambers, and means operated by the tilting of said container for controlling operation of said valve means.

13. In a fluid weight meter, a tiltable container, a reciprocal piston in said container dividing the interior thereof into expansible chambers at opposite ends of said piston, inlet and outlet means for each of said chambers, valve means controlling said inlet and outlet means of each chamber and operable to alternately direct fluid flow into said chambers, fulcrum members for said container and spaced apart in the direction of movement of said piston, said container being tiltable by and upon a fluid weight differential in said chambers, and means operated by the tilting of said container for controlling operation of said valve means, and adjustment means operable on said fulcrum members for varying the weight differential necessary to tilt said container.

14. In a fluid weight meter, an elongated container, a piston in said container dividing the interior thereof into expansible chambers on opposite sides of said piston, inlet and outlet means for each of said chambers, valve means controlling the inlet and outlet means of each of said chambers and operable alternately to direct fluid flow to said chambers, the fluid entering one of said chambers moving said piston to discharge fluid from the other of said chambers with accompanying increase of fluid in said one chamber, and a pair of fulcrum members for and spaced apart longitudinally of said container, said container having a neutral position on said fulcrums, said container tilting in one direction upon predetermined increase in fluid in said one chamber, and means controlling operation of said valve means and actuated by the tilting of said container.

WILLIAM S. CLARKSON.